United States Patent

[11] 3,548,913

| [72] | Inventor | Gerhart L. Gerbeth<br>Akron, Ohio |
|---|---|---|
| [21] | Appl. No. | 747,686 |
| [22] | Filed | July 25, 1968 |
| [45] | Patented | Dec. 22, 1970 |
| [73] | Assignee | The Goodyear Tire & Rubber Company<br>Akron, Ohio<br>a corporation of Ohio |

[54] CLIP FOR WHEEL RIM
1 Claim, 5 Drawing Figs.

[52] U.S. Cl. ..................................................... 152/406
[51] Int. Cl. ..................................................... B60b 25/06, B60b 25/22
[50] Field of Search ........................................... 152/410, 406, 407; 301/5, B, 37CR

[56] References Cited
UNITED STATES PATENTS

| 2,178,502 | 10/1939 | Stone | 152/407 |
| 2,137,416 | 11/1938 | Rubsam | 301/5 |
| 2,258,011 | 10/1941 | Inman | 301/5 |

FOREIGN PATENTS

| 630,400 | 11/1961 | Canada | 301/5 |

*Primary Examiner*—Arthur L. La Point
*Attorneys*—F. W. Brunner and Paul E. Milliken ABSTRACT: A clip for covering the ends of a split side ring on a wheel rim assembly. The clip is made of a single piece of metal bent to conform substantially in cross section to the cross-sectional contour on the side ring on which it is placed. The clip fits over the side ring in the area of the split and covers the ends of the ring in such manner that they do not chafe the tire bead. The clip has a plurality of bent tabs which prevent the clip from moving circumferentially on the side ring and a plurality of bent prongs which engage the tire bead and prevent the clip from moving radially outwardly on the side ring.

PATENTED DEC22 1970 3,548,913

INVENTOR.
GERHART L. GERBETH
BY
*[signature]*
ATTORNEY

CLIP FOR WHEEL RIM

This invention relates to a clip for covering the ends of a split side ring on a wheel rim assembly to prevent chafing of the tire bead by the ends of the ring.

BACKGROUND OF THE INVENTION

It has long been known in the prior art to use a split side ring which is removably attached to one side of a wheel rim on wheels used on trucks, busses, trailers and other similar vehicles. The split side ring is necessary where the side flanges of the wheel rim are of such a large diameter in comparison to the diameter of the bead seat that tires used on the wheel cannot readily be mounted and demounted from the rim by stretching them over the side flanges in the same manner as that used when changing tires on automobiles and smaller vehicles. The split side ring having an integral side flange makes it possible to remove the side flange from one side of the rim base and thereby permit the tire to be readily removed without stretching over the tire bead. The split in the side ring is necessary to permit the side ring to expand in diameter a sufficient amount to permit the side ring to slide over a retaining flange which holds the side ring in position. One of the problems encountered with the split in the side ring is that the edges of the opposed ends of the side ring may tend to rub or chafe the tire bead in the area adjacent the ends of the side ring.

OBJECTS OF THE INVENTION

It is a primary object of this invention to provide a clip which may be readily snapped onto a removable split side ring in the area of the split to protect the adjacent area of the tire bead from chafing by the ends of the ring.

Another object of this invention is to provide a clip which is inexpensive to manufacture and may be made as one integral piece.

A still further object of the invention is to provide a clip which may be easily fastened securely to the side ring and which is prevented from moving in either the circumferential direction of the side ring or radially outwardly from the side ring.

These and other objects of the invention will become more fully apparent as the description proceeds in the following specification and the attached drawings.

DESCRIPTION OF THE PREFERRED EMBODIMENTS

Figure 1:
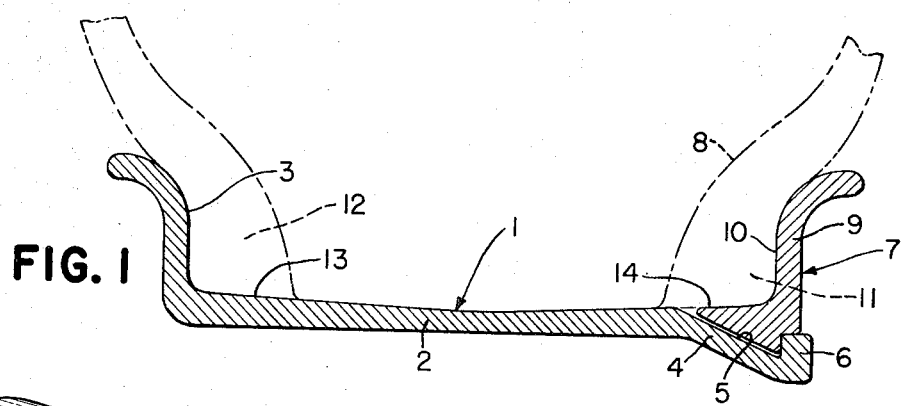
FIG. 1 is a cross-sectional view of a typical wheel rim of the type using the clip of the present invention.
Figure 2:
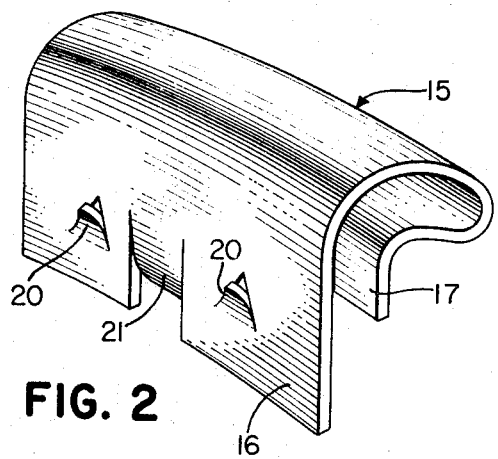
FIG. 2 is a perspective view of the clip of the invention showing the side of the clip which faces axially inwardly and contacts the bead of the tire.
Figure 3:
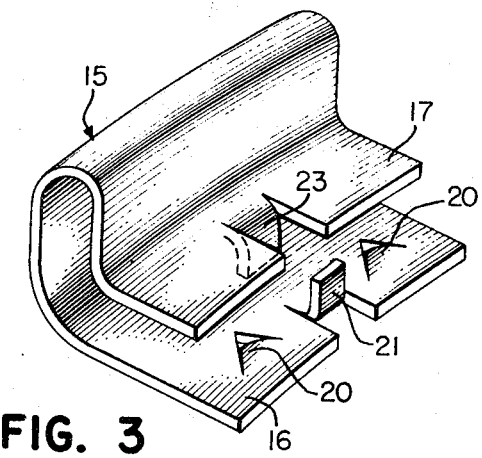
FIG. 3 is a perspective view of the clip shown in FIG. 2 but showing the opposite side thereof.

Referring now to FIG. 1, a typical wheel rim is indicated generally by the numeral 1. The wheel rim 1 has an annular rim base 2 with an integral side flange 3 extending radially outwardly from one of the axially outer edges thereof. At the opposite edge of the rim base 2, is a gutter portion 4 having an annular gutter groove 5 and a radially outwardly extending retaining flange 6 axially outwardly from the groove 5. A split side ring 7 is contoured to engage the gutter groove 5 and the retaining flange 6 to hold the ring 7 on the rim base 2 when a tire 8 is mounted on the rim and inflated. The side ring 7 has a radially outwardly extending bead-retaining flange 9 having an axially inwardly facing surface 10 in contact with the bead portion 11 of a tire 8. On the opposite side of the tire from the bead portion 11 is a bead portion 12 which bears against the integral side flange 3 and seals against the bead seat 13. Similarly, the bead portion 11 seals against a bead seat 14 on the side ring 7. In addition, the bead 11 may seal against the rim base 2, if the bead is of sufficient width as shown in FIG. 1. It should be understood that an additional seal may be provided between the side ring 7 and the rim base 2 in the area of the gutter groove 5. There are many various seal configurations which may be used to accomplish this seal; however, since this forms no part of the invention, no seals will be illustrated or described in this application.

Figure 4:
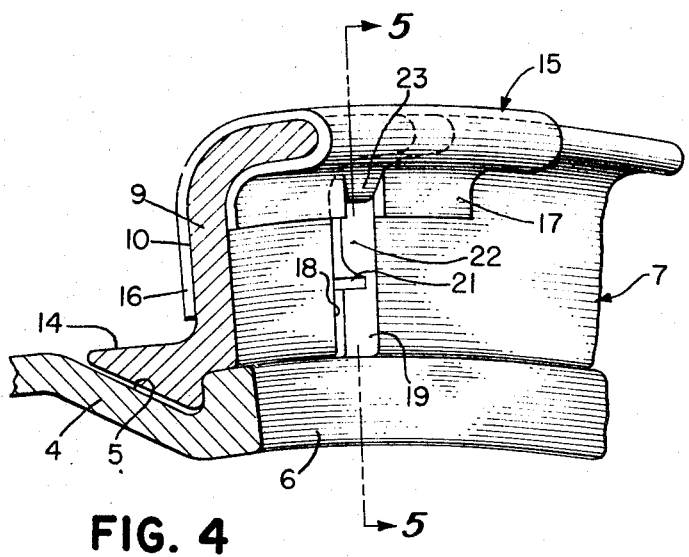
FIG. 4 is a fragmentary perspective view of the clip of the invention shown mounted on a side ring with portions broken away to better show the cross-sectional contour of the clip and the side ring.
Figure 5:
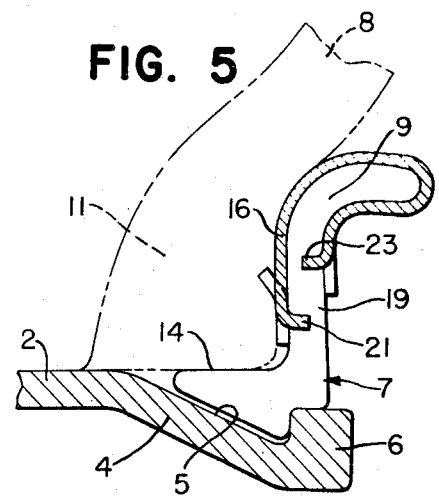
FIG. 5 is a cross-sectional view taken on lines 5–5 of FIG. 4 showing the manner in which the clip engages the side ring.

Referring now to FIGS. 2 through 5, the clip of the invention is indicated generally by the numeral 15. The clip 15 is made preferably of metal having a springlike quality so that it may be snapped into position on the side ring 7 and will maintain a gripping action against each side thereof. The clip 15 is formed in a configuration which conforms substantially to the cross-sectional contour of the ring 7 as shown in FIGS. 4 and 5. The clip 15 is normally stamped from metal. However, it is contemplated that other materials and forming methods may be used. The clip 15 has an inner portion 16 and an outer portion 17. When the clip 15 is placed on the side ring 7, as shown in FIGS. 4 and 5, the inner portion 16 lies between the inner surface 10 of the ring 7 and the outwardly facing surface of the tire bead 11. This portion of the clip covers the ends 18 and 19 of the ring 7 and prevents the inner edges of the ends from rubbing against the tire bead and chafing the tire. The inner portion 16 has a pair of inwardly bent prongs 20 which engage the outer surface of the tire bead 11 and prevent the clip 15 from moving radially outwardly from between the tire bead 11 and the side ring 7 and thereby slipping off the side ring. The inner portion 16 has a centrally located outwardly bent tab for extending into the split 22 between the ends 18 and 19. A similar inwardly bent tab 23 is located centrally on the lower edge of the outer portion 17. The tab 23 also extends into the split 22. The tabs 21 and 23 both engage the ends 18 and 19 of the ring 7 and prevent the clip 15 from sliding in either direction circumferentially around the ring 7.

It may thus be seen that the clip is held firmly in position on the ring 7 in such a position that it will prevent chafing of the tire bead by the ends 18 and 19 of the ring 7.

It will also be understood that other variations such as the number and arrangement of the tabs and the prongs are also contemplated within the scope of the invention and the cross-sectional contour of the clip will vary depending upon the contour of the side ring on which it is used.

Various other changes can be made in the illustrative embodiments shown herein without departing from the scope of the invention.

I claim:

1. A clip for covering the ends of a split side ring on a wheel rim assembly to prevent chafing of the tire bead by the ends of the ring when a tire is mounted on the rim, the clip comprising:

A. a body member formed in a cross-sectional contour which will conform substantially to the cross-sectional contour of the split side ring on which it is placed, said body member having:
1. an inner side ring contacting portion for positioning between the axially inner surface of the side ring and the axially outer surface of the tire bead; 2. an outer side ring contacting portion for positioning on the axially outer surface of the side ring;
3. said body member being sufficiently resilient to permit the inner and outer portions to spread apart to permit the clip to be placed in position upon the side ring with said clip maintaining tension against the side ring to retain it in position thereon;
4. said body member having an integral tab on each of the side ring contacting portions for positioning between the ends of the side ring, each tab being bent substantially at right angles to the body member to extend toward the opposite side ring contacting portion to prevent circumferential movement of the clip with respect to the split side ring; and 5. said inner side ring contacting portion of the clip having a plurality of axially inwardly bent sharp pointed integral prongs for preventing radial outward movement of the clip.